Figure 5:
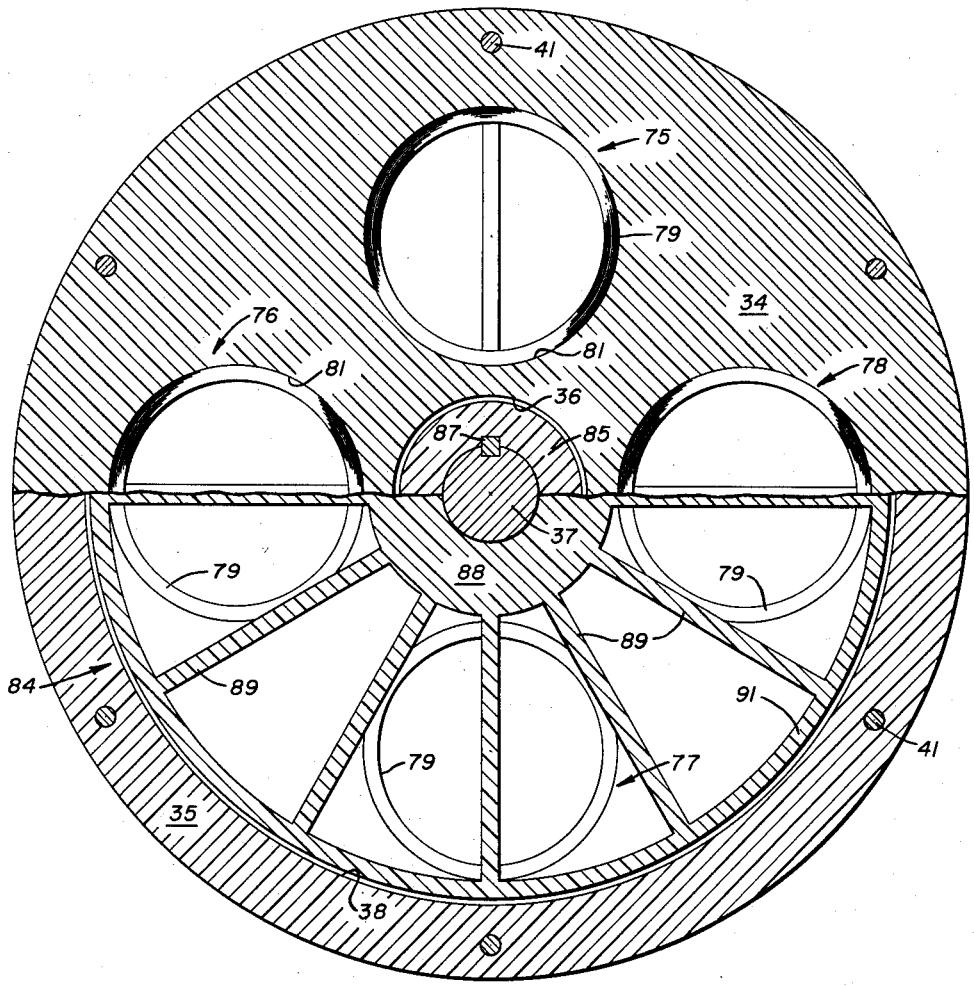

Jan. 23, 1962 S. A. COLGATE 3,018,396
SOLENOID STATOR DYNAMOELECTRIC MACHINES
Filed March 13, 1958 12 Sheets-Sheet 1
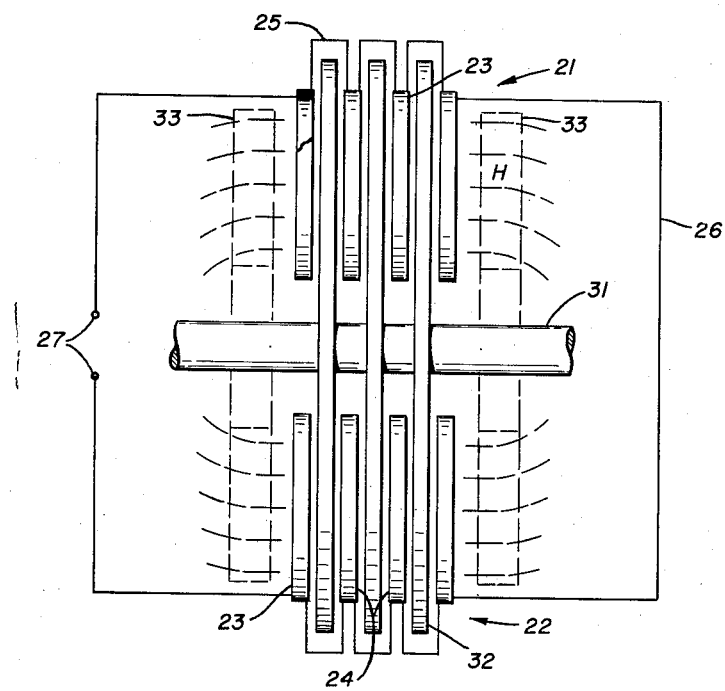
FIG_1_
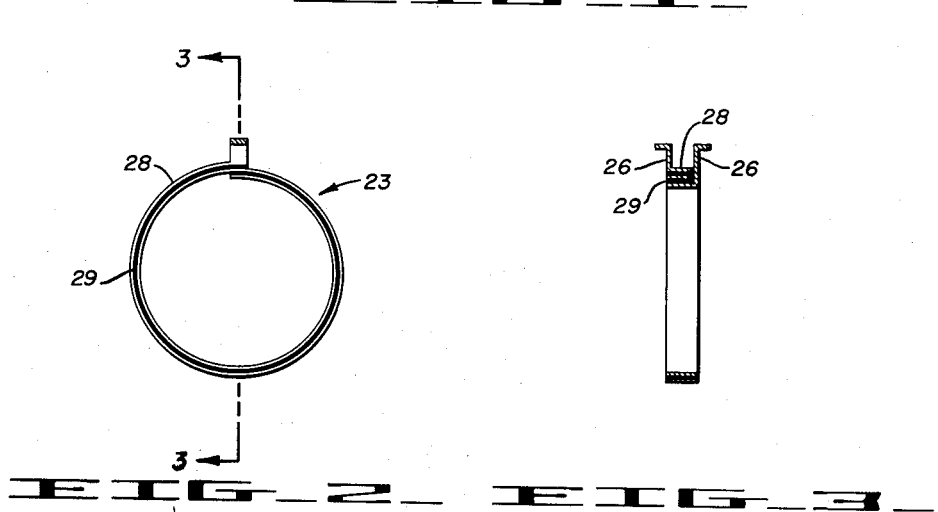
FIG_2_ FIG_3_
INVENTOR.
Stirling A. Colgate
BY
William D. Hager
ATTORNEY Jan. 23, 1962 S. A. COLGATE 3,018,396
SOLENOID STATOR DYNAMOELECTRIC MACHINES
Filed March 13, 1958 12 Sheets-Sheet 2
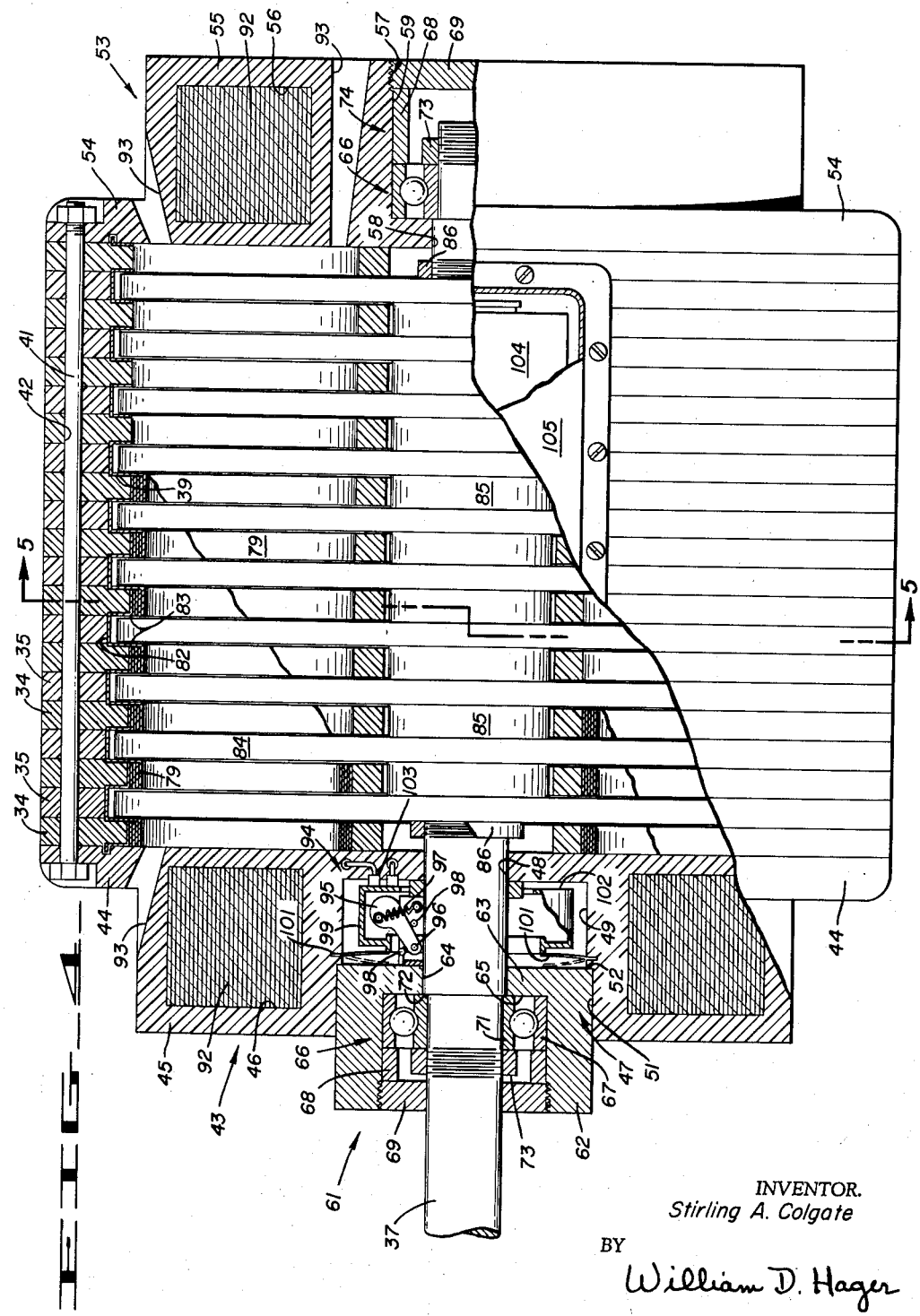
INVENTOR.
Stirling A. Colgate
BY
William D. Hager
ATTORNEY Jan. 23, 1962  S. A. COLGATE  3,018,396
SOLENOID STATOR DYNAMOELECTRIC MACHINES
Filed March 13, 1958  12 Sheets-Sheet 3

INVENTOR.
Stirling A. Colgate
BY
William D. Hager
ATTORNEY

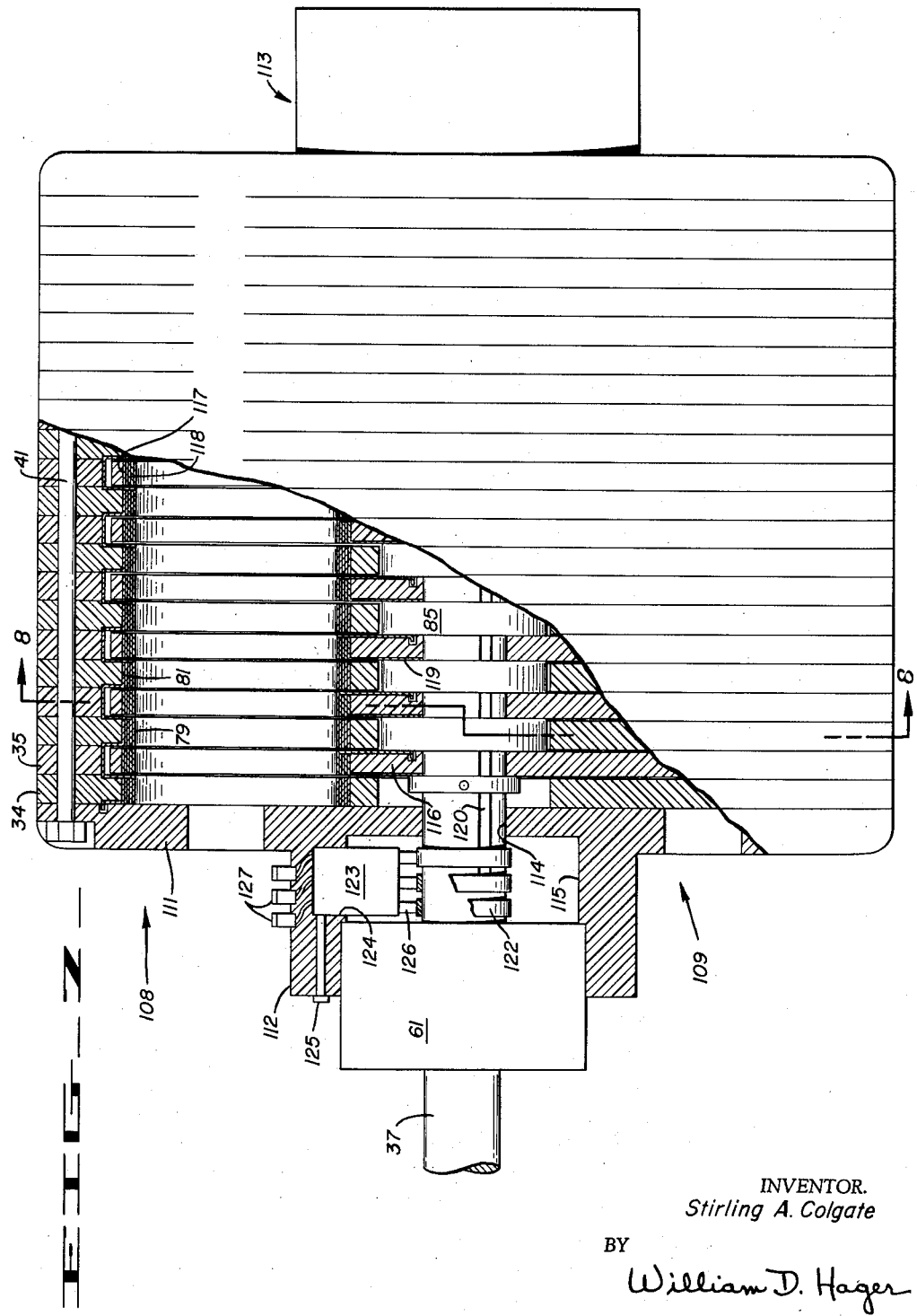

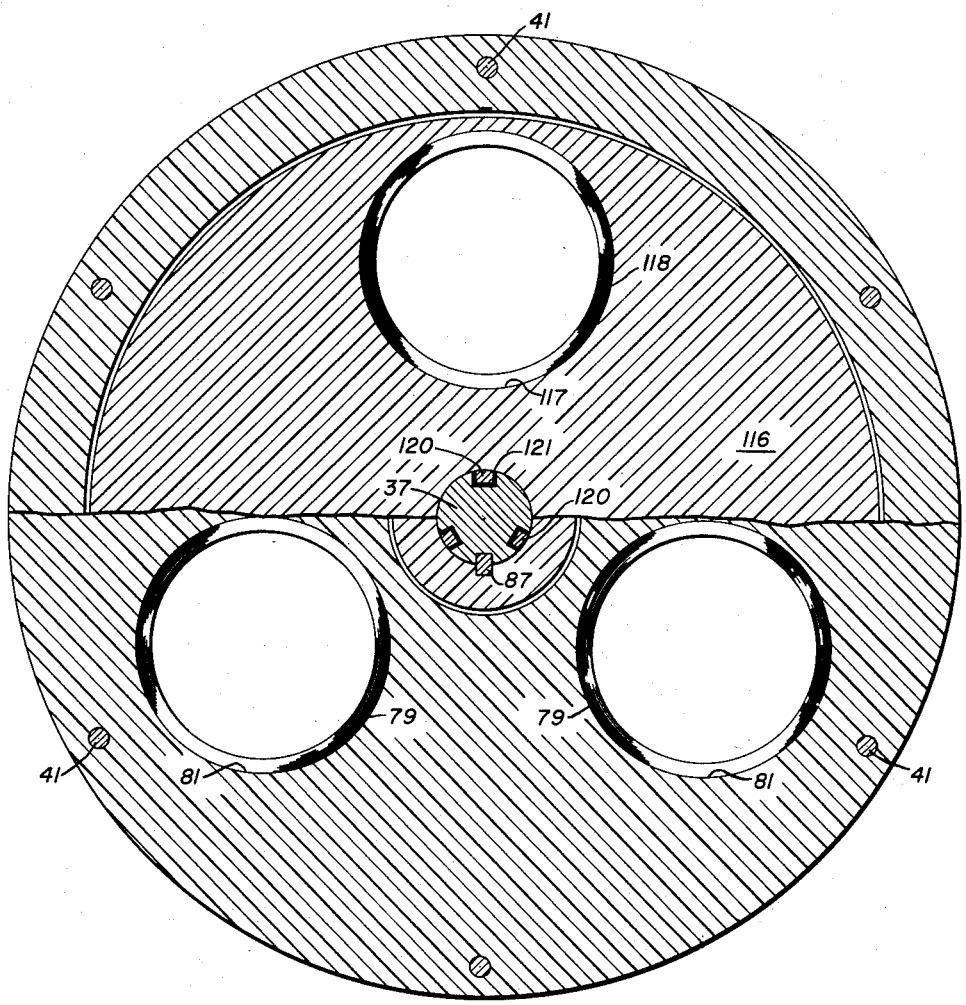

Jan. 23, 1962    S. A. COLGATE    3,018,396
SOLENOID STATOR DYNAMOELECTRIC MACHINES
Filed March 13, 1958    12 Sheets-Sheet 6
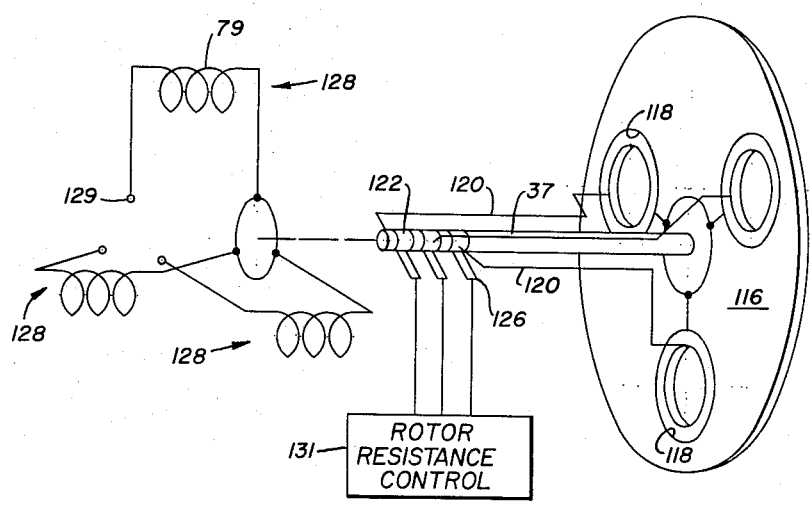
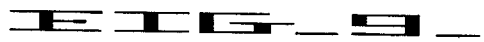
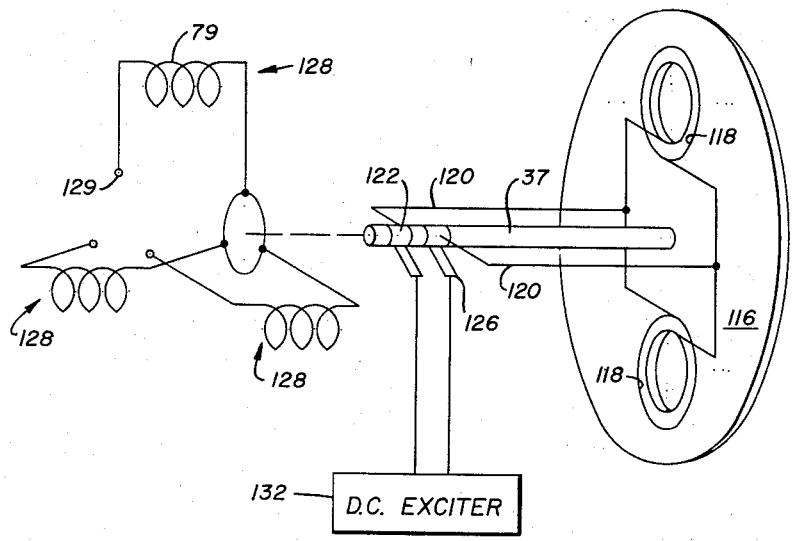
INVENTOR.
Stirling A. Colgate
BY
William D. Hager
ATTORNEY

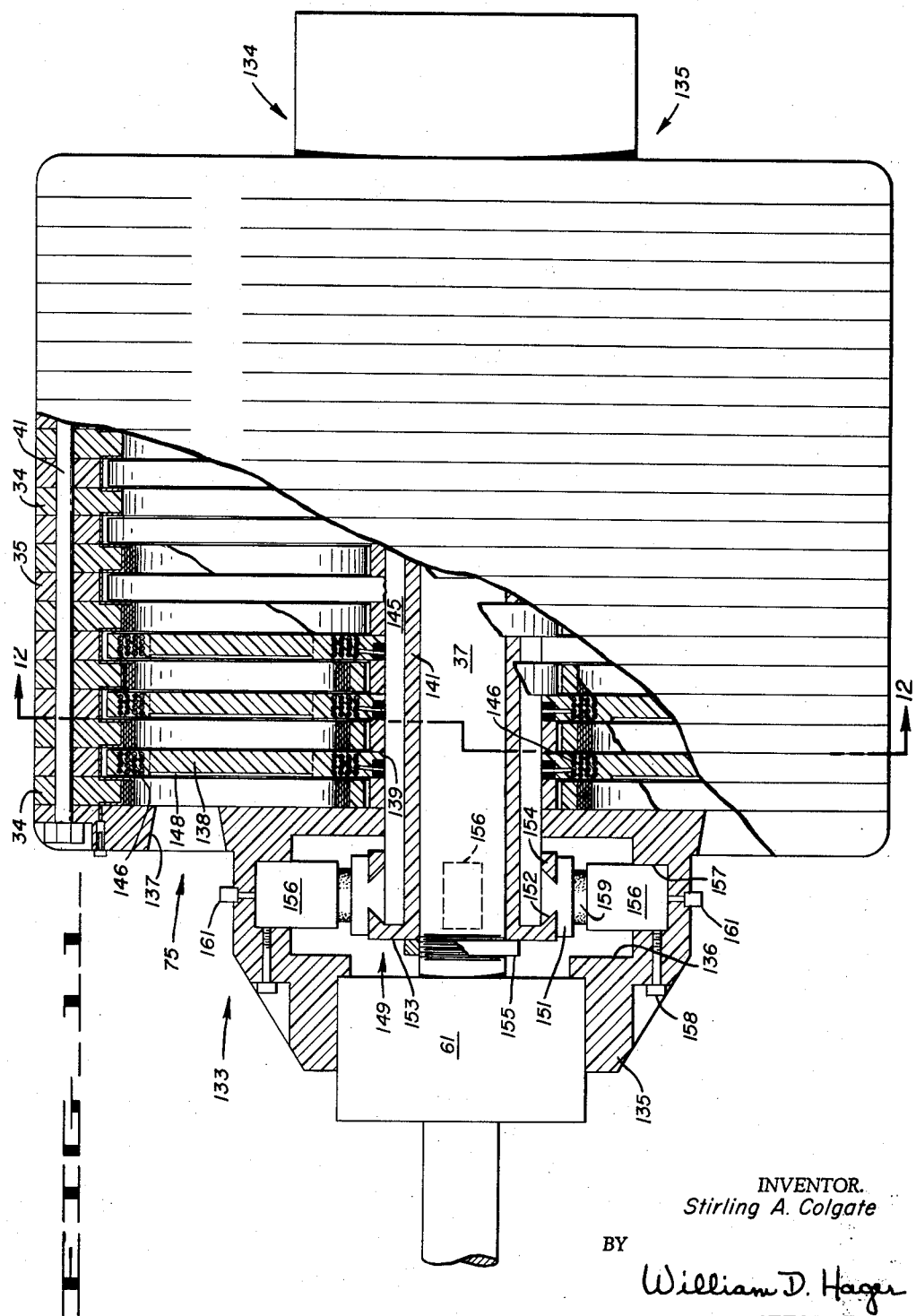

Jan. 23, 1962       S. A. COLGATE       3,018,396
SOLENOID STATOR DYNAMOELECTRIC MACHINES
Filed March 13, 1958       12 Sheets-Sheet 8

INVENTOR.
Stirling A. Colgate
BY
William D. Hager
ATTORNEY

Jan. 23, 1962    S. A. COLGATE    3,018,396
SOLENOID STATOR DYNAMOELECTRIC MACHINES
Filed March 13, 1958    12 Sheets-Sheet 10

INVENTOR.
Stirling A. Colgate
BY
William D. Hager
ATTORNEY

Jan. 23, 1962  S. A. COLGATE  3,018,396
SOLENOID STATOR DYNAMOELECTRIC MACHINES
Filed March 13, 1958  12 Sheets-Sheet 11
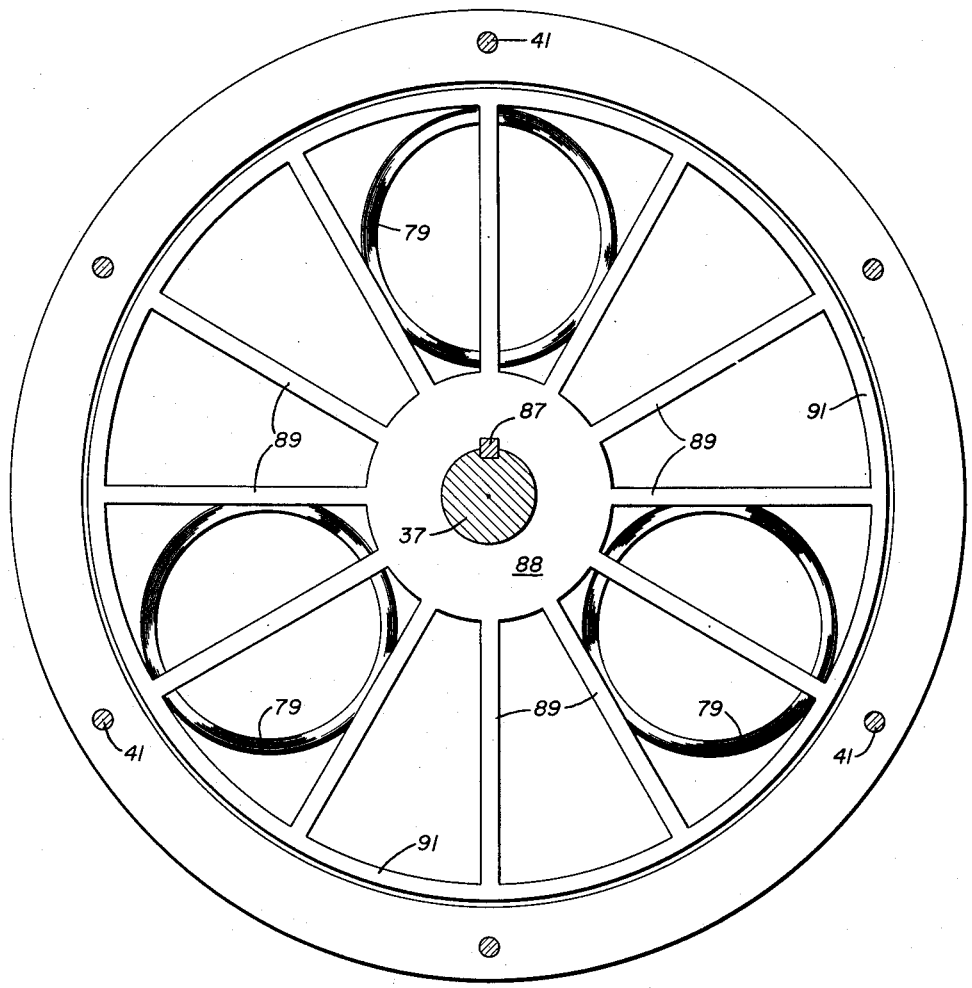
FIG_16_
INVENTOR.
Stirling A. Colgate
BY
William D. Hager
ATTORNEY

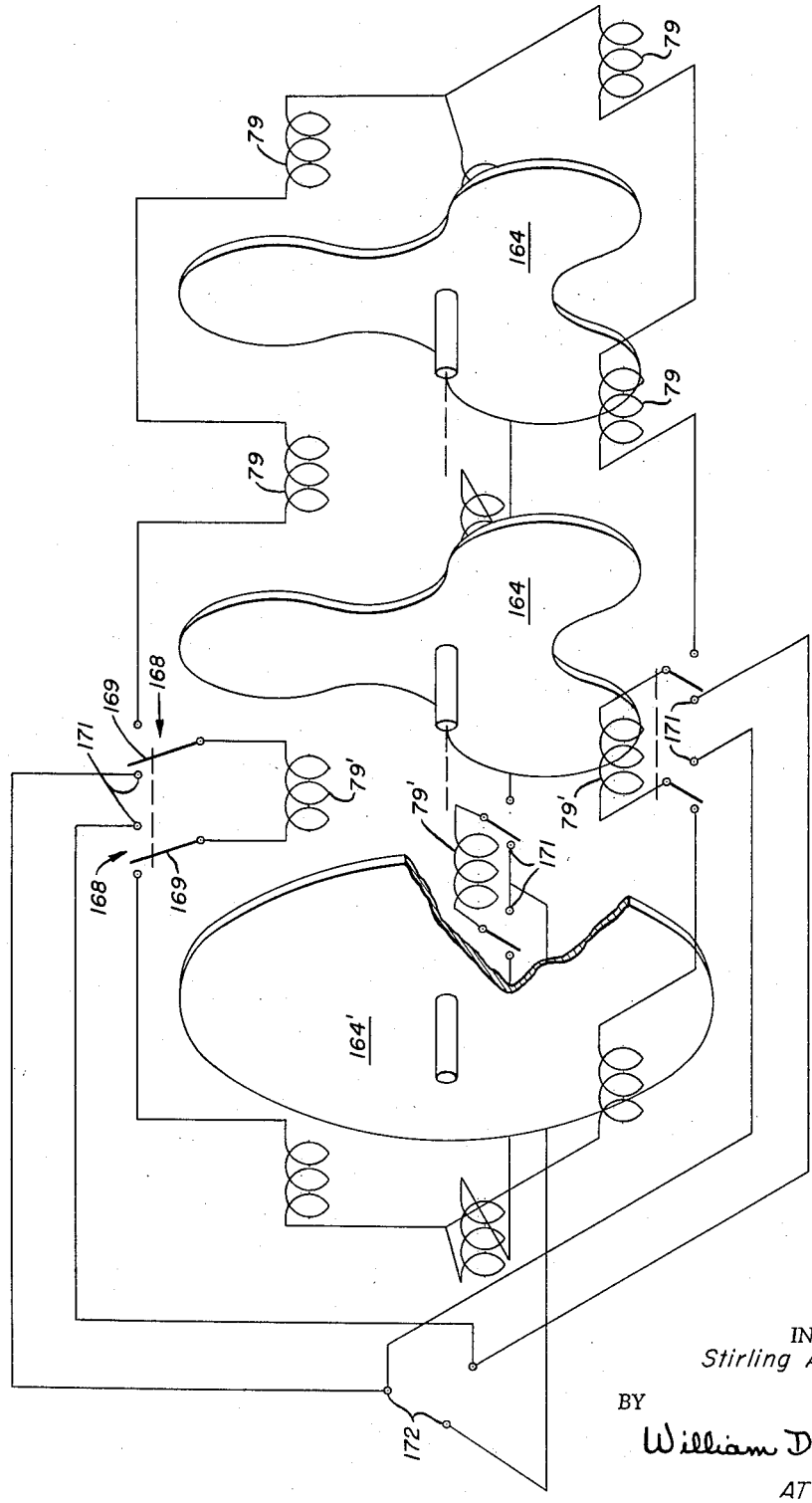

United States Patent Office 3,018,396
Patented Jan. 23, 1962

3,018,396
SOLENOID STATOR DYNAMOELECTRIC
MACHINES
Stirling A. Colgate, 134 Estates St., Livermore, Calif.,
assignor of fifty percent to Richard M. Colgate, Oldwick, N.J.
Filed Mar. 13, 1958, Ser. No. 721,144
23 Claims. (Cl. 310—268)

The present invention relates to the interconversion of electrical and mechanical energy and more particularly to a complete class of electrical motors and generators characterized by light weight, high efficiency, improved cooling provisions, and in which little or no iron need be used in the magnetic circuit.

Rotary dynamoelectric machines are presently available in a wide variety of types, various designs being adapted for particular use as a motor or as a generator, for use with alternating or direct current systems, and for producing certain specific performance characteristics. All of the various types have, however, a degree of structural similarity in that all utilize a rotor turning within an annular stator. It is a further common characteristic of the various types of dynamoelectric machine that, in the zone of interaction between the rotor and the stator magnetic field, the field is directed generally radially with respect to the rotary axis of the machine. As a consequence of the radial magnetic field design, large quantities of iron have always been used in the magnetic circuit for the purpose of reducing the energy stored in the stray flux. In the absence of substantial quantities of iron, the proportion of the magnetic field available to interact with the rotor is relatively small and a severe lowering of efficiency results.

The use of large quantities of iron in the magnetic circuit, which for the foregoing reason is a virtual necessity in conventional apparatus, introduces certain pronounced disadvantages. The more obvious of these disadvantages are weight, bulk, cost, and difficulty of fabrication and repair. Among the problems associated with the latter disadvantage is the requirement that conductors be intricately and tediously wound around the iron core structure. A serious consequence of the resultant tight and closely packed winding is the difficulty in removing and dissipating heat generated by resistance within the windings. It is generally not practical to circulate coolant within the interior of the windings except in very large and costly installations. The only practical cooling method commonly available for application to dynamoelectric machines is to circulate air around the external surfaces of the windings. The thermal transfer characteristics are poor under these conditions and the current circulating in the windings must therefore be limited to avoid overheating. Thus the heating problem associated with tight iron core windings effectively places a limit on the power which can be obtained with a conventional machine of given size.

Accordingly a dynamoelectric machine construction using iron free, or relatively iron free, windings, will have obvious advantages in terms of weight, heat dissipation provision, and power obtainable from a given size machine, provided the construction permits close coupling between the rotor and stator magnetic field.

The present invention provides the highly desirable iron free, or relatively iron free, construction by utilizing a stator comprised of solenoid coils aligned generally parallel with the rotary axis of the machine, such coils being displaced from the rotary axis of the machine and being, in the more usual case, distributed equiangularly around the azimuth of the rotor. The basic advantage of using a solenoid coil for establishing a stator field is that the solenoid has the inherent property of containing a large proportion of its magnetic energy within the open interior of the coil. In addition, the return flux of a first coil may be carried by a second coil only a small proportion being outside the coils in the form of stray flux. Provided the rotor can be made to couple closely to the magnetic field within the stator solenoid, the proportion of the field which does not interact with the rotor is very small and very high efficiency results. Moreover, large quantities of air or other coolant can be circulated through a coreless solenoid coil permitting the removal of extreme quantities of heat.

To achieve the desired close coupling between the rotor and the stator solenoids, the solenoids have a special construction, each such solenoid being formed of a plurality of slightly spaced apart series connected coil sections, such coil sections being circular in form and preferably having an axial thickness roughly equal to the spacing between adjacent coil sections. Provided the coil sections are thin in the axial direction relative to the diameter of the coil and providing the gaps between successive coil sections are correspondingly small, little magnetic flux is lost in the form of stray field. The foregoing segmented construction of the stator solenoids provides transverse gaps through the coil through which conductors secured to the rotor may sweep and interact with the magnetic field of the solenoids.

In general it will be found most satisfactory to use the stator solenoids in pairs, or in some multiple of two, in D.C. and in single phase A.C. systems. In multiphase A.C. systems, three solenoids, or some multiple of three solenoids, is generally preferable. Thus one solenoid can carry most of the return magnetic flux of the other. An iron annulus at each end of the stator, which annulus connects the extremities of the solenoids, will reduce the stray flux still further. The iron needed for this purpose is far less than that required in a conventional machine of comparable size. It should be emphasized moreover, that the use of the iron annuli is not a necessity since it adds only a small fraction, of the order of twenty percent, to the overall efficiency of the apparatus.

It will be observed that the magnetic field of the foregoing solenoid stator structure is directed parallel to the rotary axis of the machine whereas in a conventional dynamoelectric machine, the primary magnetic field is radial. Thus unique forms of armature are required in the present invention. Just as in conventional machines, a wide variety of armatures may be used according to the performance characteristics desired and according to the type of current system, i.e. direct current, alternating current, single phase or multiphase, with which the machine is to operate. All such armatures, however, have a degree of similarity in structure. The generalized armature comprises a rotor shaft journalled along the axis of the machine and a plurality of flat generally circular discs mounted on the shaft in coaxial relationship therewith. The aforementioned discs are spaced apart along the shaft and occupy longitudinal positions thereon corresponding to the positions of the gaps in the stator solenoids. The discs have slightly less width than the solenoid gaps and have a radial dimension exceeding the displacement of the solenoids from the rotor axis so that the discs extend across the interior of the solenoids and interaction between the magnetic field of the solenoids and conductors on the discs is effected.

The detailed design of the rotor discs, and in particular, the nature of the conductors thereon, vary considerably between the various types of machine. Examples of various rotor designs will hereinafter be described in connection with specific representative embodiments of the invention. It will be observed from the various embodiments to be described, that for virtually every type of conventional machine there can be an analogous machine constructed in accordance with the present inventive concept. Although a conventional machine of a given type differs markedly in structure from a corresponding machine constructed in accordance with the present invention, certain analogies in the structure, and similarities in basic principle and in performance will be found. Thus while a limited number of dynamoelectric machines of representative types will be herein described, the application of the inventive concept to other types of generators and motors will be apparent to those skilled in the art, and it will be understood that the invention is applicable to a complete new class of dynamoelectric machines. The principal identifying characteristic of this new class of such machines is the use of one or more segmented solenoids, aligned in parallelism with the rotary axis of the machine, as a stator.

It is thus an object of this invention to provide a new and superior group of dynamoelectric machines, including machines adapted for use with the various types of electrical current systems and having various specific performance characteristics.

It is an object of the invention to provide a superior mechanism for the interconversion of electrical and mechanical energy.

It is a further object of this invention to provide a class of dynamoelectric machines in which little or no iron is required in the magnetic circuit.

It is an important object of this invention to provide a light weight, highly efficient, construction for electrical motors and generators.

Still a further object of this invention is to provide a class of dynamoelectric machine having relatively open windings whereby coolant can be more efficiently circulated through the windings and relatively large quantities of heat can be removed from the machine and dissipated.

It is an object of the invention to provide a class of rotary electrical motors and generators characterized by a primary magnetic field which is directed generally parallel to the rotary axis of the motor or generator in the region in which interaction between a rotor and stator field occurs.

It is an object of the invention to provide a group of dynamoelectric machines having unique armature structures with which efficient coupling to a non-radial stator field is effected.

Still another object of this invention is to provide a novel stator for use with rotary electrical motors and generators, which stator provides for a magnetic field directed generally parallel to the rotary axis of the device.

Figure 6:
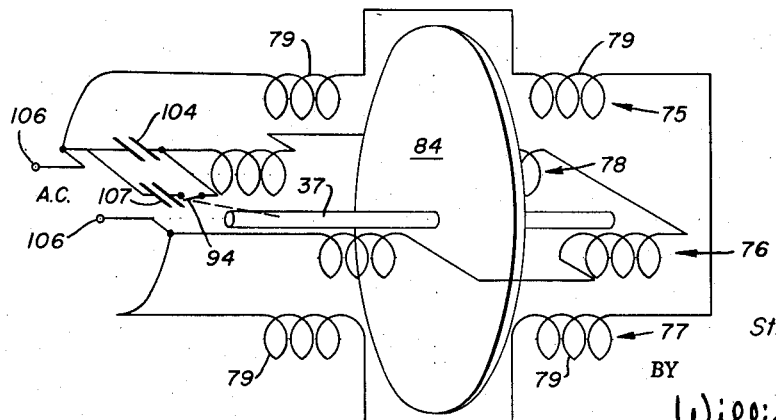
Figure 12:
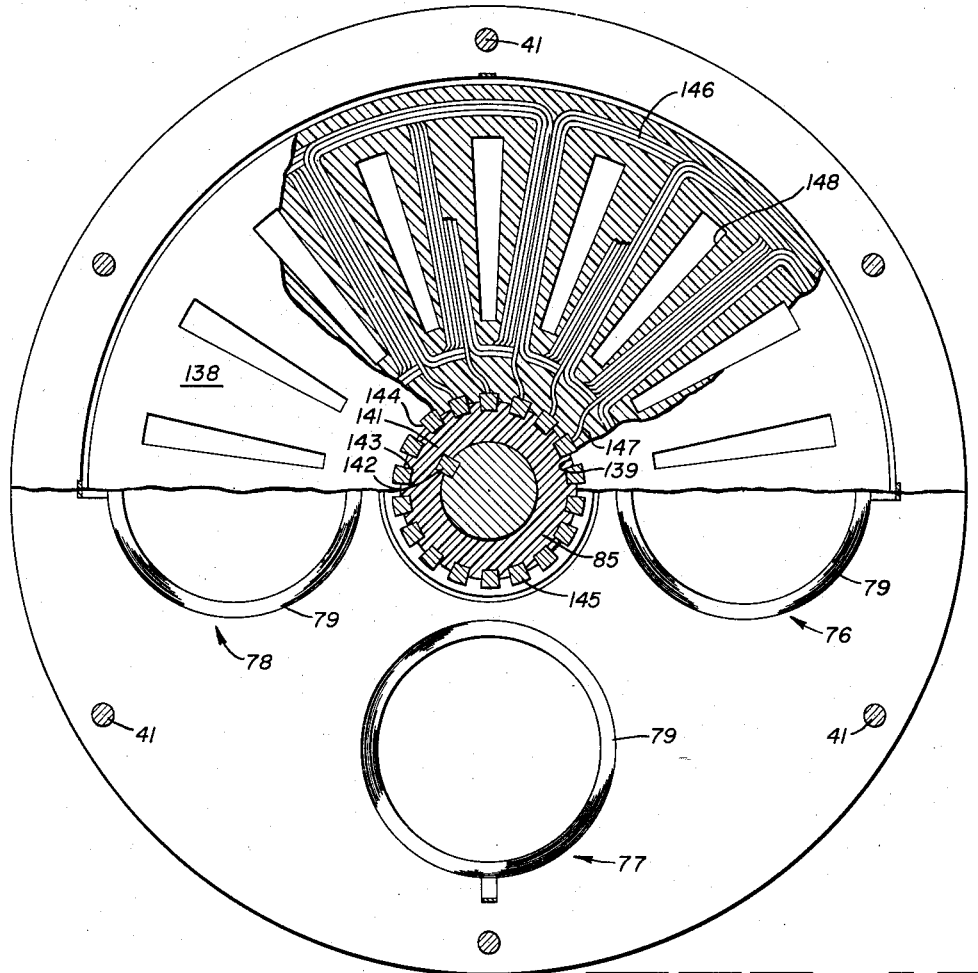
Figure 13:
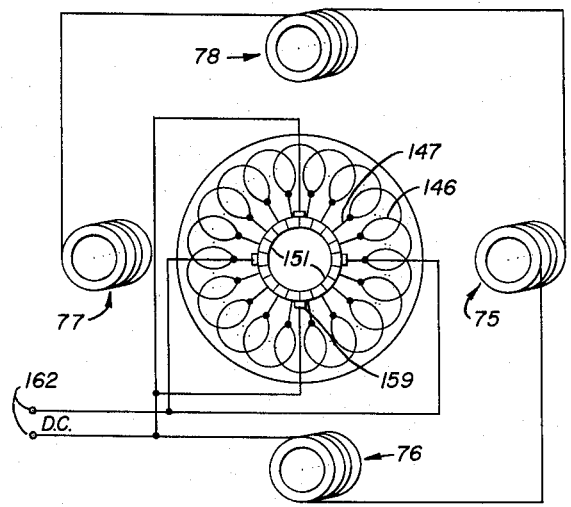
Figure 14:
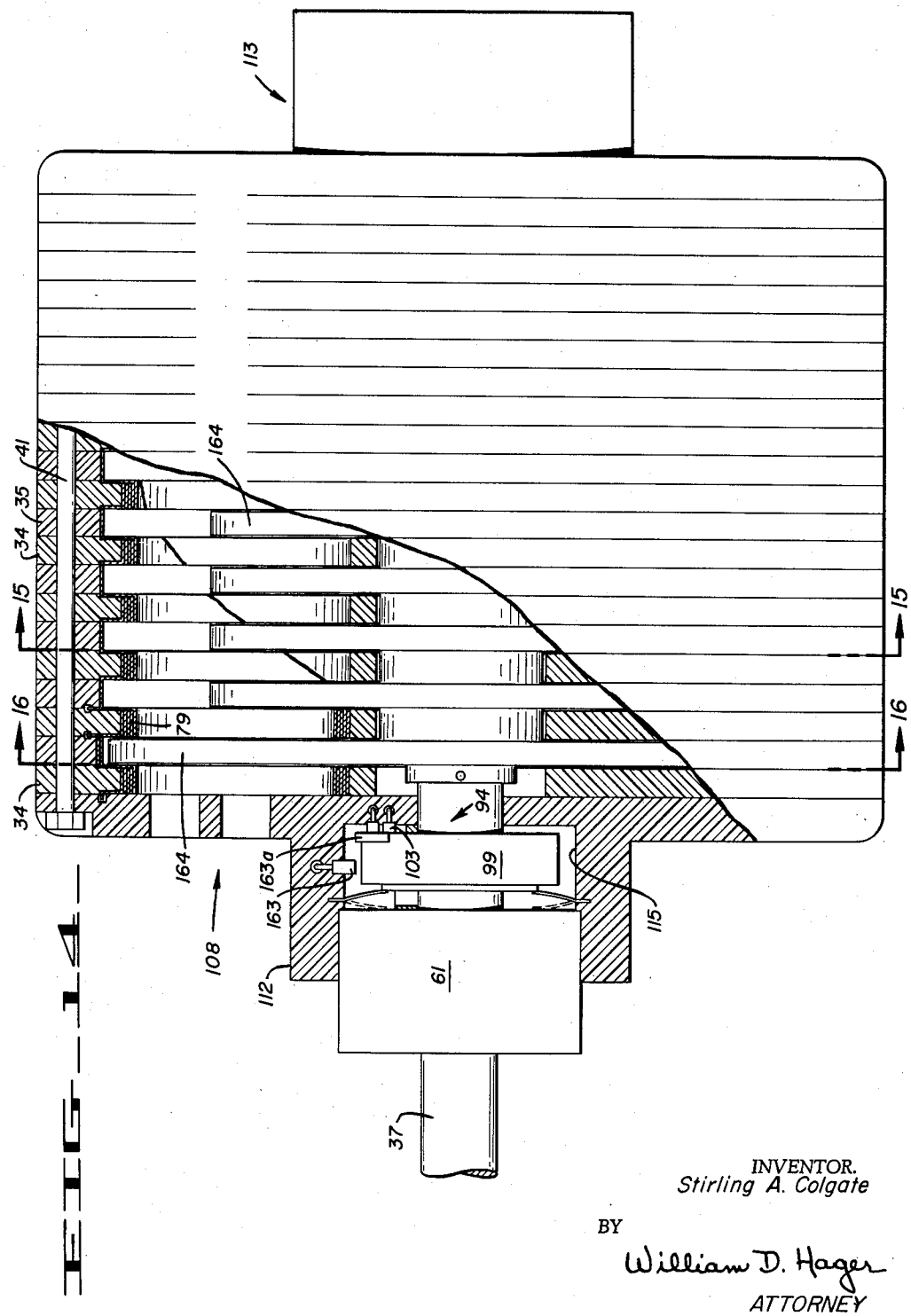
Figure 15:
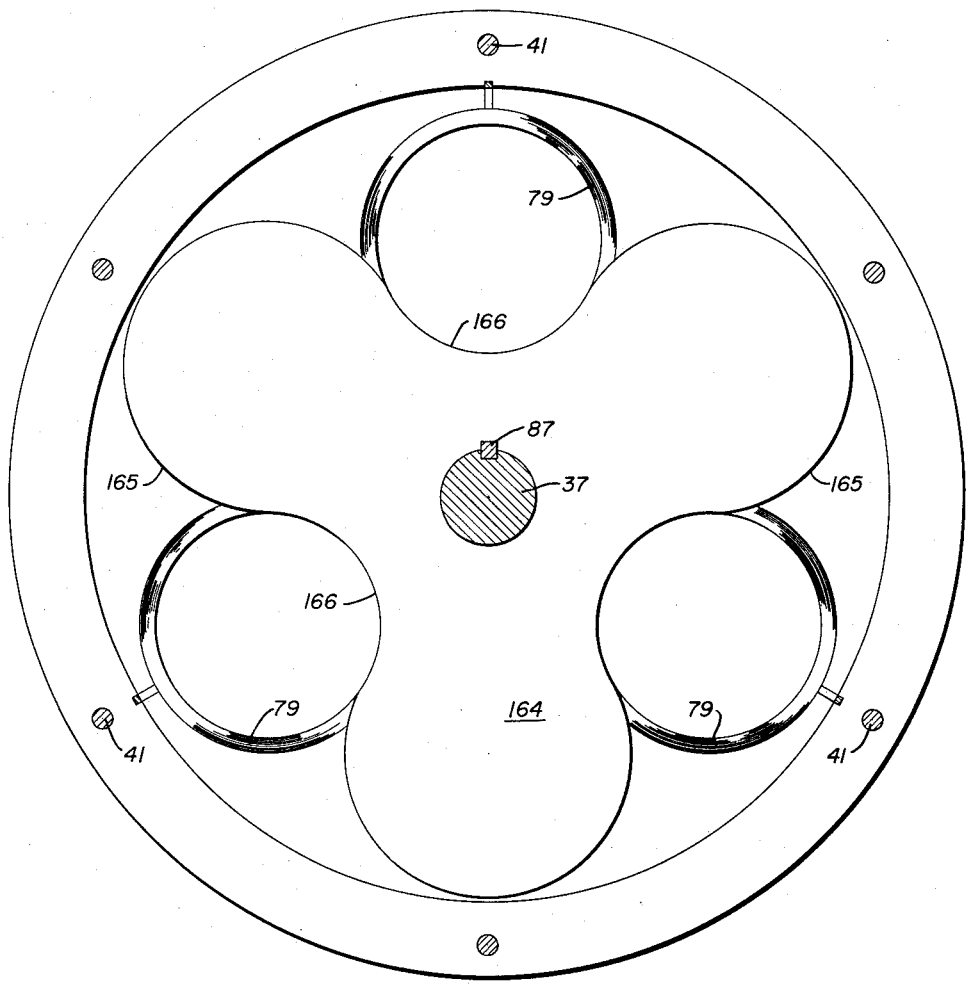

The invention, both as to its organization and method of operation, together with further objects and advantages thereof, will best be understood by reference to the following specification taken in conjunction with the accompanying drawing, in which:

FIGURE 1 is a view showing portions of a rotary armature and a pair of segmented solenoid coils disposed parallel therewith and illustrating the general principle by which an armature may be caused to interact efficiently with the magnetic field of the solenoids, FIGURE 2 is an end view of one of the coil segments which form the solenoid coils shown in FIGURE 1 which view illustrates a preferred method of winding the coil segments, FIGURE 3 is a cross sectional view of a portion of the coil segment shown in FIGURE 2 taken along line 3—3 thereof, FIGURE 4 is a cutaway view of a four coil, single phase, capacitor start, capacitor run induction motor showing a typical application of the invention to the design of a dynamoelectric machine, FIGURE 5 is a staggered cross section view taken along line 5—5 of FIGURE 4, FIGURE 6 is a schematic diagram showing the electrical connections between components of the motor shown in FIGURES 4 and 5, FIGURE 7 is a cutaway view of a wound rotor three phase induction motor or generator illustrating the application of the invention to multiphase equipment, FIGURE 8 is a staggered cross section view taken along line 8—8 of FIGURE 7, FIGURE 9 is a schematic diagram showing the rotor and stator electrical connections of the apparatus shown in FIGURES 7 and 8, FIGURE 10 is a schematic diagram showing how a dynamoelectric machine basically similar to that shown in FIGURES 7 and 8 is modified to constitute an alternator or revolving D.C. field synchronous motor, FIGURE 11 is a cutaway view of a four stator solenoid direct current motor or generator showing a typical application of the invention to direct current systems, FIGURE 12 is a staggered cross section view taken along line 12—12 of FIGURE 11 and further clarifying the structure of the D.C. machine shown therein, FIGURE 13 is a schematic diagram illustrating the electrical connections between components of the D.C. machine shown in FIGURES 11 and 12, FIGURE 14 is a cutaway view of a resonant synchronous machine utilizing the solenoid stator structure, which machine operates on a unique principle which has not heretofore been utilized in conventional radial field dynamoelectric machines, FIGURE 15 is a cross section view taken along line 15—15 of FIGURE 14, FIGURE 16 is a cross section view taken along line 16—16 of FIGURE 14 and showing starting provisions for the apparatus thereof, and FIGURE 17 is a schematic diagram showing the electrical connections between components of the resonant synchronous machine shown in FIGURES 14, 15, and 16.

Referring now to the drawing, and more particularly to FIGURE 1 thereof, there is shown the general structure by which an armature may be made to couple closely with the magnetic field within a solenoid. This basic structure is utilized in each of the various representative embodiments of the invention to be hereinafter described and is a preferred means for obtaining the most efficient coupling. It should be understood, however, that simple, relatively inefficient forms of the invention are possible in which a single stator solenoid or a single rotor disc are used and it is not intended to limit the invention to machines utilizing a plurality of multiple segmented stator solenoids.

In FIGURE 1 two solenoid coils 21 and 22 are shown: for purposes of illustration, the coils being positioned in parallel, spaced apart relationhsip. Each of the coils 21 and 22 is formed of a plurality of circular coil sections or segments 23, the coil sections of each of the solenoids being spaced apart and being coaxial. To reduce the loss of magnetic flux, the coil sections 23 should be thin in the axial direction in relation to their diameter and the gaps 24 between adjacent coil sections should be correspondingly thin. It should be observed, moreover, that each of the solenoid coils 21 and 22 is formed of a like number of coil sections 23, corresponding coil sections of each of the two solenoids being co-planar so that the transverse gaps 24 of each of the solenoids are in matching longitudinal positions. In order that the coil sections 23 of each solenoid 21 and 22 function as a single extensive coil, the sections of each coil are connected in series by suitable jumper conductors 25. In order that one solenoid will carry the return flux of the other, thereby reducing the stray flux, the two coils 21 and 22 are connected in series so as to exhibit opposite magnetic polarities. Thus a conductor 26 connects one end of coil 21 with the corresponding end of coil 22, the opposite ends of the coils being connected with terminals 27 of an external current system which, in the case of a motor, supplies excitation to the coils.

Referring now to FIGURES 2 and 3, there is shown a preferred construction for the solenoid coil sections 23, such construction being but one example of a suitable means. Each coil comprises a tape wound "pancake coil" formed of a flat strip conductor 28 and a matching strip of insulating material 29 wound together in spiral fashion, the conductor and the insulating strip each being the full width of the coil section. A varied number of turns may be provided according to the type and strength of current which is to excite the coil, but in any case a substantial open area must be left in the center of the coil. As shown in FIGURE 3, jumper conductors 26 connect with each end of the strip conductor 28, such conductors extending radially outward from the coil for a small distance for reasons which will hereinafter be apparent.

Referring now again to FIGURE 1, there is shown a rotor shaft 31 disposed midway between the two solenoids 21 and 22 in parallelism therewith, the shaft being journalled for rotation about its own axis. A plurality of rotor discs 32 are secured to the shaft 31 in coaxial relationship therewith, such discs being spaced apart along the shaft at positions corresponding to the transverse gaps 24 in the solenoids 21 and 22. The discs 32 have an axial width slightly less than the width of the solenoid gaps 24, the difference in width being the minimum needed to provide adequate clearance and which difference in width is exaggerated in FIGURE 1 for purposes of clarity. The discs 32, in most instances, have a diameter exceeding the total displacement of the solenoids 21 and 22 from rotor shaft 31 so that the discs extend completely through the solenoid gaps 24 and project a slight distance on the far side of the solenoids.

In any specific embodiment of the invention, various types of armature conductors will be provided on the rotor discs 32, examples of which will be hereinafter described. It will be observed that as a consequence of the interleaving of solenoid coil sections 23 and rotor discs 32 close coupling of an armature and the magnetic field H of the solenoids is achieved. Conductors of one form or another which are disposed within the rotor discs 32 sweep across the interior of the solenoids and interact with a large proportion of the field therein. It will be found that the degree of interaction between the armature conductors and the solenoid field may be still further increased by the use of a small amount of iron. Specifically, an iron annulus 33 may be disposed at each end of the solenoids, in coaxial relationship with shaft 31. Provided the iron annuli 33 have an inside diameter not excessively greater than the separation of the solenoids 21 and 22, the annuli will carry the return magnetic flux of one solenoid to the other and very little of such flux will be lost to stray field. It should be emphasized, however, that the annuli 33 are not essential to the invention. Such annuli increase the efficiency of a generator or motor by a factor of the order of twenty percent and can therefore be dispensed with, in many cases, without serious results.

It will be noted that the above described principle provides for a very light weight structure in comparison with conventional apparatus of comparable capacity. The solenoids 21 and 22, moreover, are relatively open and a large flow of air may be readily forced through the apparatus for cooling purposes either by connection, by a fan attached to shaft 19, or by an external blower system.

Referring now to FIGURES 4 and 5, there is shown the detailed structure of a representative dynamoelectric machine utilizing the foregoing principles, the apparatus being a capacitor start, capacitor run, single phase induction motor. As is well understood, the induction motor constitutes one of several major types of electrical motor. In the present invention, just as in conventional apparatus, there are various modifications possible within the general category of induction motor, such modifications differing in the method of starting, operating characteristics, and type of excitation current used. Thus the choice of a single phase capacitor start capacitor run motor should not be construed as exhaustive of the application of the invention to the induction motor art. In view of the analogies in operating principle between the present invention and conventional equipment, which analogies will hereinafter be pointed out, various modifications of the invention coming within the general category of induction motor will suggest themselves to those skilled in the art.

Considering first the stator and associated mechanisms there is shown a stator frame formed of stacked annular frame members 34 and 35 twenty one such frame members being utilized in this embodiment, which frame members are disposed together in coaxial relationship. The frame members 34 and 35 are formed of insulating material, canvas base plastic being a suitable material, and are thin in the axial direction relative to the diameter. Alternate ones of the frame members, specifically those designated by numeral 34 which category includes the two end ones of the frame members, have a considerably smaller inside diameter than the intervening ones of said frame members, the intervening frame members being designated by numeral 35. As best shown in FIGURE 5 in particular, the central opening 36 of the frame members 34 is only slightly greater than that required for the passage of a rotor shaft 37 therethrough, while the central opening 38 of the frame members 35 has a diameter of the order of five sixths the outside diameter of the frame members. The frame members 35 thus constitute spacers providing gaps 39 between the more solid frame members 34.

The stacked frame members 34 and 35 are secured together by through bolts 41 which bolts pass through longitudinal bores 42 distributed around the periphery of the assembly. Secured against a first end of the stator frame, by bolts 41, is a front end member 43 which member 43 is formed of insulative material and which has an outside diameter equal to that of the frame members 34 and 35. The front end member 43 is provided with a peripheral flange 44 through which the through bolts 41 pass, a relatively thick intermediate section 45 which section is provided with an annular chamber 46 of rectangular cross section, and a three stepped axial bore 47, bore 47 has a first section 48, of relatively narrow diameter and length, adjacent the first frame member 34, a second section 49 of substantially greater diameter and length, and a third section 51 which third section is slightly greater in diameter than second section 49 thereby forming a shelf 52 within the bore 47.

Similarly secured to the opposite end of the stator frame, by through bolts 41, is a back end member 53 which member 53 is provided with a peripheral flange 54, an intermediate section 55 which forms an annular chamber 56 corresponding to chamber 46 of front end member 43, and a two stepped axial bore 57 which bore has a first section 58 corresponding to first bore section 48 of front end member 43, and a second section 59 of larger diameter and greater length.

Considering now provision for journalling the rotor shaft 37 along the axis of the motor, there is shown a front bearing assembly 61 disposed within third section 51 of bore 47 in the front end member 43. The front bearing is secured within an annular bearing housing 62 which housing is secured coaxially within the bore section 51, by threads or other suitable means, the housing being penetrated into the bore a sufficient distance to abut against shelf 52 thereof. The inner end 63 of housing 62 is closed except for an axial bore 64 of diameter equal to the first section 48 of 47 thus forming a shelf 65 against which an annular ball bearing assembly 66 is disposed. The outer race 67 of ball bearing assembly 66 is held in place by a cylinder 68 which presses against the edge of the race and which is in turn held in place by an annular externally threaded fastener 69 which engages internal threads in the housing 62. It will be observed that the inner race 71 of the ball bearing has an inside diameter slightly less than that of the bore 47 in order that a shoulder 72 on the rotor shaft 37 may be abutted against the bearing to prevent axial movement of the shaft. To lock the inner bearing race in position, a nut 73 is threaded coaxially on rotor shaft 37 and bears against the edge of the race opposite shoulder 72.

A back bearing assembly 74 is disposed within bore 57 of back end member 53, the elements of the bearing assembly being disposed directly within the bore rather than in a housing. Back bearing 74 is similar in structure to front bearing 61 and includes an annular ball bearing assembly 66, pressure cylinder 68, fastener 69, and lock nut 73, each arranged as previously described. It will be observed that the rotor shaft 37 terminates at back bearing 74 but extends a substantial distance beyond the front bearing 61 in order that a drive pulley or gear may be attached to the shaft as desired.

Four matching segmented stator solenoids 75, 76, 77, and 78 are utilized in this embodiment, the solenoids being parallel to the rotary axis of the machine as defined by rotor shaft 37 and being distributed equiangularly around the azimuth of the shaft. Each such solenoid is formed of eleven coil segments or sections 79 wound as hereinbefore described, each coil having an axial width equal to that of the stator frame member 34 and 35 and having a diameter at least several times its axial width. One of the coil segments 79 of each of the stator solenoids is secured within each of the stator frame members 34, each such frame member 34 being provided with four transverse openings 81 for receiving the coil segments, the openings 81 having a diameter equal to that of the coil segments and being equiangular spaced around the azimuth of the frame member. Successive coil segments 79 of each individual solenoid are series connected by means of jumper conductors 82 which conductors extend radially outward along the face of the frame members 34, cross the inside surface of the frame members 35, and extend radially inward along the adjacent frame member 34 and make contact with the outer turn of the coil segment therein. The mode of connection between the various solenoids, and the proper connections to an outside single phase alternating current system, will be hereinafter described.

The positioning of successive coil sections 79 of each of the stator solenoids 75, 76, 77, and 78, in the spaced apart frame members 34, forms ten matching transverse gaps 83 in each of the solenoids. A circular armature disc 84 is secured coaxially on rotor shaft 37 concentric with each such gap 83 in the stator solenoids. Each such disc 84 has a diameter slightly exceeding the maximum displacement of the stator solenoids from the axis of the shaft 60 so that the discs extend completely through the solenoids and project a small distance on the far side thereof, and each disc has an axial thickness almost equal to that of the frame members 35, the difference in thickness being the minimum need for adequate clearance.

The necessary spacing between discs 84 is maintained by an annular spacer 85 disposed coaxially on rotor shaft 37 between each adjacent pair of discs, the stack of alternated discs 84 and spacers 85 being secured together by a pair of annular clamps 86 one of which is threaded on the rotor shaft 37 at each end of the stack. As shown in FIGURE 5, the discs 84 and spacers 85 are locked to shaft 37 by a key 87.

Referring now to FIGURE 5 in particular, it may be seen that discs 84 have a cartwheel structure characterized by a central hub portion 88, a plurality of equiangularly spaced radial spokes 89, and an annular rim 91 to which the spokes connect. It should be understood that the spokes 89 extend completely across the interior of the solenoids, the hub 88 being confined to the region inward from the solenoids and the rim 91 being beyond the solenoids. This cartwheel structure of the rotor discs 84 is analogous to the squirrel cage of a conventional radial field induction motor, and the factors determining the number of spokes, and cross sectional thickness of the spokes, are essentially similar to those affecting the design of a conventional squirrel cage and will be apparent to those skilled in the art.

Referring now again to FIGURE 4, there is shown a pair of iron annuli 92 of mean radius equal to the displacement of the solenoid axes from the axis of shaft 37, one such annulus being disposed in chamber 46 of front end member 43 and the other being disposed in chamber 56 of back end member 53. The annuli 92 serve to carry the return flux of each solenoid to the opposing solenoid of inverse polarity and, since alternating current is used in this embodiment, the annuli are preferably laminated. The annuli 92 are formed to be less thick in the radial direction than the inside diameter of the solenoids so that passages 93 may be provided in the end members 43 and 53 for admitting cooling air to the interior of the solenoids.

Since this embodiment is a capacitor start capacitor run motor, switch means must be provided for eliminating a starting capacitor from the stator circuit when the motor reaches operating speed, such switch means being preferably internally contained and centrifugally operated. Any of the customary rotor speed controlled switches may be utilized with the present invention. Thus in FIGURE 4 there is shown a typical switch assembly 94 disposed within the second section 49 of bore 47 of the front end member 43, the switch comprising a weight 95 secured at one end to rotor shaft 37 by a pivot pin 96 and adapted to swing outward from the shaft under the influence of centrifugal force. A tension spring 97 is provided to draw the weight 95 in towards the shaft 37, and stops 98 are positioned to limit motion of the weight in each direction. An annular switch member 99 is disposed coaxially around the rotor shaft and is secured to the wall of bore 47 by flexible arcuate leaf springs 101. The resiliency and curvature of the springs 101 allow the switch member 99 to occupy either of two stable positions, one such position being axially forward from the other. Switch member 99 is provided with annular end walls 102 on either side of weight 95 so that, with proper dimensioning, outward motion of the weight will cause the switch member to assume the forward position and inward motion of the weight will cause the switch member to assume the rear position. It will be observed that the switch member over-travels the weight in either position so that no wearing of rotor and stator members occurs during operation. Two contacts 103 are mounted in the wall of end member 43 in position to be contacted by the switch member 99 when the switch member occupies the rear position. Thus movement of the switch member 99 to the forward position, produced by high speed revolution of the rotor, acts to open the circuit between the contacts 103 and, as will be described, disconnect the starting capacitor from the stator circuit. The required capacitors, of which one capacitor 104 is shown in FIGURE 4, are disposed in a housing 105 secured to the exterior surface of the stator frame.

Referring now to FIGURE 6 there is shown schematically the electrical connections between components of the apparatus described above, a single rotor disc 84 and the adjacent two successive coil segments 79 of each stator solenoid being shown inasmuch as the remaining coil segments and interleaved rotor discs are similarly arranged.

As previously described, successive coil segments 79 of each of the four stator solenoids 75, 76, 77, and 78 are series connected. A first stator solenoid 75 is connected at a first end with one terminal 106 of a single phase alternating current supply. The opposite end of first stator solenoid 75 connects with the corresponding end of the stator solenoid 77 situated on the opposite side of rotor shaft 60. The first end of solenoid 77 connects with the second A.C. supply terminal 106 so that the solenoids 75 and 77 are series connected with the current supply and have opposed magnetic polarities. The remaining two stator solenoids 76 and 78 are similarly series connected with the supply terminals 106 and are thus in parallel with the solenoids 75 and 77.

To split the phase between the solenoid 75 and 77 circuit and the solenoid 76 and 78 circuit a running capacitor 104 is series connected with the latter thereby causing the current in solenoids 76 and 78 to lead that in solenoids 75 and 77 by substantially ninety electrical degrees. As will be understood by analogy with conventional induction motors, the effect of this phase splitting is to produce a rotating magnetic field, which field contrasts with that of conventional motors in that it is directed generally parallel to the rotary axis of the motor. As will similarly be understood by analogy with conventional motors, the effect of the rotating magnetic field is to turn the rotor disc 84 at a speed equal to the field speed less the effects of the slip field.

To increase the starting torque by providing increased capacitance in the circuit of stator solenoids 76 and 78, a starting capacitor 107 is connected in parallel with running capacitor 104 such connection being made through centrifugal switch 94. As previously described, centrifugal switch 94 opens when the rotor has attained operating speed and thus disconnects the starting capacitor from the stator circuit.

While this embodiment of the invention has been described as a motor, it is comparable to the conventional radial field machine in that it may be caused to function as an asynchronous generator by providing excitation to the stator and mechanically driving the rotor shaft. Moreover various modifications of the basic motor design described above will suggest themselves. One pair of stator solenoids may, for example, be used as an auxiliary winding for starting purposes and be disconnected when the motor is up to speed. Any even number of stator solenoids may be utilized. It will be apparent that the necessary phase splitting may be effected by means other than the described capacitors, the use of resistors being a well known means for this purpose. Similarly, shading coils may be used as a starting means.

Referring now to FIGURES 7 and 8 there is shown a three phase wound rotor induction motor illustrating a wound rotor construction as applied to the present invention and illustrating an application of the invention to multiphase systems.

The stator assembly 108 of this embodiment follows the general constructional principles described above in connection with the single phase induction motor, the principal differences being the use of three stator solenoids instead of four, the replacement of the centrifugal switch with slip rings and bushes, and the absence, in this embodiment of iron annuli for carrying magnetic flux between solenoids. Thus the stator is composed of stacked coaxial frame members 34 and 35 secured together by through bolts 41, these elements being similar to those previously described except insofar as the frame members 34 are provided with only three equiangularly spaced transverse openings 81 for receiving the stator solenoid segments 79. The front end member 109 comprises a flat circular section 111 secured against the stacked frame members by bolts 41 and an axially projecting annular bearing housing 112, the back end member 113 being of similar construction. The front and back end members 109 and 113 are transpierced by axial bores 114 through which rotor shaft 37 passes and the bearing housings 112 have sufficient internal diameters to mount ball bearing assemblies similar to those described in connection with the previous embodiment. The front bearing assembly 61 is not disposed completely within the housing 112 so that a chamber 115 is formed therein.

Considering now the wound rotor construction, the rotor discs 116 in this embodiment are formed of insulative material and are solid except for three equiangularly spaced transverse openings 117 which match, in dimensioning and radial position, the openings 81 in the frame members 34. Disposed coaxially within rotor disc openings 117 are rotor coil segments 118 which are identical in shape and design with the stator solenoid coil segments 79. The leads 119 from each rotor coil segment 79 are directed radially inward along either side of the surface of each rotor disc 116.

Three parallel axial bus bars 120 are mounted in longitudinal grooves 121 in rotor shaft 37, the bus bars being flush with the surface of the shaft and being spaced one hundred and twenty degrees apart around the azimuth of the shaft. The bus bars 120 are insulated from the shaft and extend through section 111 of front end member 109 into chamber 115 of housing 112. As in the previously described embodiment, rotor discs 116 and the intervening spacers 85 are locked to the rotor shaft 37 by a key 87.

Three conducting annular slip rings 122 are disposed coaxially on shaft 37 within chamber 115, the rings being spaced apart from each other and being insulated from the shaft. Each of the rings 122 makes electrical contact with a separate one of the bus bars 120 but is insulated from the remaining two of the bus bars. A brush holder 123 is secured in a cavity 124 in the interior wall of chamber 115 by a retaining screw 125, the brush holder projecting radially inward towards slip rings 122. Three carbon brushes 126 are spring mounted within the holder 123 and ride upon the outside surface of rings 122 making electrical contact therewith. Each such brush 126 is connected with a terminal 127 mounted on the outside surface of housing 112.

Referring now to FIGURE 9 there is shown the electrical connections between the elements of the wound rotor induction motor described above, one rotor disc 116 and one set of stator solenoid segments 79 being shown inasmuch as the remaining rotor discs are similarly connected and the remaining stator solenoid segments are series connected with those shown.

Considering first the stator solenoids, a Y connection is herein employed, a corresponding end of each of the stator solenoids 128 being connected together and the opposite end of each of the solenoids being connected with an individual one of the three terminals 129 of a three phase alternating current supply. It will be understood, however, that delta connection may be utilized if desired. The described connection will establish the rotating magnetic field needed for induction operation. As is the case with conventional induction motors, the three phase motor needs no separate starting means as the field has a definite rotational sense.

Considering now the rotor winding connections, it will be understood that the rotor disc 116 is turned by the rotating stator field in a manner generally similar to that of the single phase motor previously described. The particular advantage of the wound rotor construction is that the resistance of the rotor conductors may be varied thus improving the power factor of the rotor circuit and increasing the starting torque. Corresponding terminals of each rotor coil segment 118 are connected together in a Y connection, the remaining terminal of each coil segment being connected with an individual one of the rotor shaft bus bars 120. Through the connections previously described, specifically bus bars 120, slip rings 122 and brushes 126, an external variable resistance 131 is connected in the rotor circuit permitting the desired variation in the resistance thereof.

Referring now to FIGURE 10 there is shown a schematic diagram showing how a machine essentially similar to that last described may be utilized variously as an alternator or as a revolving D.C. field synchronous motor. The mechanical construction of this modification is identical to that last described insofar as the stator and stator connections are concerned, and the rotor differs only in that only two bus bars 120, slip rings 122 and brushes 126 are required, and that to approximate a sine wave where the apparatus is used as a generator, only two opposed rotor coil segments 118 are used, the rotor discs 116 being otherwise similar to that previously described. Opposite terminals of the two rotor winding segments 118 connect with a first one of the bus bars 120 and the remaining terminal of each winding connects with the second bus bar. The two brushes 126 connect with the terminals of an external D.C. exciter 132. It will be found, where three phase current is supplied to the stator solenoids 128, that the rotor disc 116 will revolve in synchronism with the stator field. Similarly, if the rotor shaft 37 is mechanically driven, a three phase current will be induced in the stator circuit. It should be understood that in this embodiment, as well as in all the other embodiments herein described, variations in the number of stator solenoids and in the number of rotor windings are possible and the invention is not limited to the particular structures shown.

Referring now to FIGURES 11 and 12, there is shown a D.C. motor illustrating the adaptation of the invention to direct current systems. The stator in this embodiment is similar in mechanical construction to that previously described in connection with the single phase induction motor of FIGURES 4 and 5, four stator solenoids 75, 76, 77, and 78 being provided. Thus frame members 34 and 35 are secured together by through bolts 41, a front end member 133 and back end member 134 being coaxially secured to the assembly by the bolts 41 such end members having axially projecting annular housings 135 mounting bearings for journalling a rotor shaft 37. The front bearing assembly 61 occupies only the forward portion of the front end member housing 135 leaving a chamber 136 at the rear of the housing in which a commutator, to be hereinafter described, is disposed. No iron annuli are used in this embodiment, thus broad passages 137 may be provided in the end members 133 and 134 to admit air to the interior of the stator. It should be observed, however, that if such iron annuli are to be provided they need not be laminated as in the previous case since only direct currents are involved.

The D.C. motor differs from the previous embodiments principally in the design of the rotor, the use of a commutator, and in the electrical connections. Considering first the rotor, it may be seen that the rotor discs 138 are solid thin cylinders formed of insulating material. The central passage 139 of discs 138 is larger in this embodiment than in the previous case inasmuch as an insulative sleeve 141 is disposed coaxially around the rotor shaft 37 between the shaft proper and the rotor discs, the sleeve being locked to the shaft by a key 142. The surface of sleeve 141 is provided with a number of longitudinal grooves 143 distributed equally around the azimuth of the sleeve and the inside edges of rotor discs 138 are provided with a like number of matching grooves 144 which latter grooves extend through the intervening rotor disc spacers 85. Disposed within each groove 143 on the sleeve 141 and extending into the adjacent groove 144 of the rotor discs 138 and spacers 85 is a bus bar 145 which bus bars serve both to carry excitation current to the rotor windings as will hereinafter be described and to lock the rotor discs to the shaft 37. The bus bars 145 extend through the back wall of front end member 133 into chamber 136 thereof.

The rotor windings comprise a number of wedge shaped coils 146 formed of insulated wire conductor, each such coil having an area substantially equal to the cross sectional area of the stator solenoid coil segments 79, such coils being preferably potted within the rotor discs 138 and being equiangularly spaced around the azimuth of the disc with the narrow extremity of the coils radially inward. The coils 146 are provided in sufficient number that they overlap, it being desirable that at least four such coils overlap within the angle subtended by a single stator solenoid since, as in conventional D.C. machines, this arrangement will minimize commutator sparking.

The electrical connections of the apparatus will be hereinafter described. It should be observed at this point, however, that successive rotor coils 146 are series connected and that one terminal of each such coil connects by means of a tap 147 with the corresponding one of the bus bars 145.

Since the rotor discs 138 in this embodiment are solid and would tend to block the passage of cooling air through the solenoids, and therefore defeat one of the objects of the invention, a plurality of radially aligned slots 148 are provided in the discs, such slots occupying the open spaces within the rotor coils 146. It will be found, moreover, that such slots are preferably made oblique with respect to the surfaces of the rotor discs 138 whereby such slots will act as a fan creating a forced draft through the motor.

Referring now to FIGURE 11 in particular for the detailed structure of the commutator 149, a number of commutator segments 151 equal to the number of bus bars 145 are disposed in an annular band coaxially around the sleeve 141 within chamber 136 of front end member 133. Commutator segments 151 are insulated from each other and each one makes electrical contact with one of the bus bars 145. To secure the commutator segments in position, each such segment has a V-groove 152 cut into either side. The end of sleeve 141 is provided with a flange 153 which projects radially outward across the ends of the bus bars 145 and curves backward into one V-groove of the commutator segments 151. An annular insulative clamp 154 is secured coaxially around sleeve 141 at the opposite side of the commutator segments and enters the opposite V-groove thereof to clamp the segments in position. To fix the longitudinal position of the sleeve 141 on rotor shaft 37, an annular fastener 155 is threaded on the shaft and bears against the extremity of the sleeve.

Four brush holders 156 are secured in cavities 157 in the interior wall of chamber 136 by retaining screws 158, such brush holders projecting radially inward and being spaced ninety degrees apart at azimuths corresponding to the axes of the four stator solenoids 75, 76, 77, and 78. A carbon brush 159 is spring mounted within each such brush holder 156 and rides upon the outside edge of the commutator segments 151. Each such brush 159 connects with a terminal 161 mounted on the outside of housing 135.

Referring now to FIGURE 13 the electrical connections between components of the above described motor are shown in schematic form. Considering first the stator connections, the four stator solenoids 75, 76, 77, and 78, are series connected with the terminals 162 of a D.C. power source, the solenoids being connected to exhibit alternate magnetic polarity around the azimuth of the motor. Since the present embodiment will be illustrated as shunt wound, opposing commutator brushes 159 are connected together and each pair of connected brushes are connected to a separate one of the D.C. terminals 162. As previously described, the rotor coils 146 are series connected and a tap 147 on each such coil connects with the matching one of the commutator segments 151.

It will be found, using the described connections, that the rotor winding current divides through the action of the commutator and flows in alternate directions in the four quadrants of the rotor. Since the magnetic polarity of the stator field is correspondingly reversed in each adjacent pair of quadrants, the rotor is subjected to a torque and the desired motor action results. It will be found, that while the motor has been described as shunt connected, it may equally well be series connected or compound connected, and moreover the various design modifications employed in conventional D.C. motors and generators to obtain specific performance characteristics will be found applicable to the present invention.

Referring now to FIGURES 14 and 15 there is shown still a further embodiment of the invention which is unique among the described embodiments in that no direct counterpart as yet exists in the design of conventional radial field dynamoelectric machines. This embodiment is designated a resonant synchronous machine and makes use of the phenomenon that an alternating magnetic field repels a conductor which is thick in relation to its electrical skin depth at the frequency of alternation of the field.

This principle is opposite to that embodied in the induction motor since in the induction motor the stator field penetrates the armature conductors. Viewed from the revolving armature the stator field of an induction motor appears almost static. It is the drag on the armature of this "almost static" field, termed the slip, that makes the induction armature turn. In the resonant synchronous motor the stator field is arranged to alternate from pole to pole when viewed from the rotating armature, for example by revolving the armature oppositely from the revolving stator field. Since the stator field as viewed from the armature is alternating this field will not penetrate armature conductors if the conductors are thick in relation to their electrical skin depth at the frequency of alternation of the field. The armature conductors are therefore repelled by the stator field, by a pressure equal to $H^2/8\pi$, and the conductors will tend to ride in the zones of lesser field intensity in the revolving stator field. An explanation of this principle as applied to a reciprocating generator will be found in my copending application Serial No. 664,255, filed June 7, 1957, and entitled Electrical Generator and Driving Engine Unitary Therewith.

The foregoing principle will be better understood by considering the detailed motor shown in FIGURES 14 and 15. The stator of this embodiment is mechanically similar to that described in connection with the wound rotor induction motor shown in FIGURES 7 and 8, such stator being formed of coaxial frame members 34 and 35 secured together by through bolts 41. A front end member 108 and back end member 113 are secured coaxially to the stator by bolts 41, the end members being identical in construction to those described in connection with FIGURES 7 and 8. Similarly, three stator solenoids comprised of coil segments 79 are mounted in the frame members 34 and a rotor shaft 37 is journalled along the axis of the assembly. The front bearing assembly 61 is again mounted in the forward portion of annular housing 112 on front end member 108 forming a chamber 115 within the housing. It will be observed that the stator in this embodiment differs from the wound rotor stator only in that the slip rings and brushes contained within the chamber 115 of the former are replaced with a snap action centrifugal switch 94 similar to that described in connection with the single phase induction motor of FIGURES 4 and 5. Such switch, in this embodiment is provided with additional contacts 163 located forwardly from a projecting conductor 164 on the switch member 99 so that the switch may act to close circuits simultaneously with the opening of circuits connected with the rear contacts 103. Three sets of rear contacts 103 and three sets of forward contacts 163 are required as will hereinafter be explained with reference to the electrical connections between components of the apparatus.

Considering now the rotor structure, the rotor discs 164 are solid conductors having a varying radial dimension such that three equiangularly spaced lobes 165 extend through the stator solenoids, the indentations 166 between the lobes being sufficiently cut out as to leave the interior of the stator solenoids free from obstruction at such time as the indentations turn through the azimuths of the solenoids. The lobes 165 are preferably circular and have an area slightly in excess of the cross sectional area of the stator solenoids. The rotor discs 164 and intervening spacers 85 are locked to the shaft 37 by a key 87.

It will be noted that the foregoing rotor design is considerably less complex than that of the majority of previously described embodiments. This simplicity is an important advantage of the resonant synchronous design inasmuch as constant speed can be maintained without the complications of wound rotor construction, slip rings, and an external D.C. exciter.

Referring now to FIGURES 14 and 16, the rotor disc 164 most adjacent the front end member 108 is of the induction cartwheel design previously described, the cartwheel having a central hub 88, radial spokes 89, and rim 91. The use of a single induction cartwheel in place of one of the lobed rotor discs provides a convenient starting means since the three phase stator will revolve an induction armature from a standstill. As will be described, the induction section is switched out of the stator solenoids by centrifugal switch 94 when the rotor approaches synchronous speed.

Referring now to FIGURE 17 there is shown a schematic diagram illustrating the electrical connections between components of the resonant synchronous machine, two lobed rotor discs 164 and the single induction cartwheel rotor disc 164' being shown. The successive coil segments 79 of each of the three stator solenoids 167 are series connected, the corresponding ends of each of the three solenoids being connected together at each end of the motor. Considering now the particular coil segment 79' of each of the three stator solenoids which is situated between the induction cartwheel 164' and the neighboring lobed rotor disc 164, it will be seen that the connection of each end of the coil segment to the adjacent coil segments is made through a switch 168 the swinger 169 of which has two positions one position connecting the coil segment with the neighboring coil segment and the second position connecting the coil segment with a power terminal 171. The two switches 168 associated with each coil segment 79' are locked for simultaneous operation so that when one side of the coil segment is connected with a power terminal 171, the opposite side of the coil segment connects with the neighboring coil segment. The power terminals 171 connect with the three terminals 172 of a three phase current supply. It will be observed, however, that in the case of two of the coil segments 79', the power terminal 171 at each end of the coil connects with a different one of the three phase supply terminals 172, both power terminals 171 of the third coil segment 79' being connected to the same supply terminal 172. Thus the action of the above described switches is to connect the induction cartwheel section of the stator with the power supply in the first position and to connect the resonant synchronous section of the stator with the power supply in the second position, the previous connection being opened in each instance. It should be observed, moreover, that the two connections are made in reverse senses, thus the stator field in the energized induction section revolves oppositely from the stator field in the energized resonant synchronous section. As has been explained, this is required in this machine since the rotor must be started to revolve in the opposite sense from the revolving field in the resonant synchronous section. The foregoing switching action is performed by the centrifugal switch 94 as described in conjunction with FIGURE 14, the switch member 99 thereof being equivalent to the swingers 169 in FIGURE 17.

In operation, the lobes 165 of the rotor discs 164 tend to traverse the stator solenoids in the interval in which the solenoid field reverses polarity. Under this condition, the retardation of the rotor disc lobe as it enters the solenoid is just compensated by the impulse imparted to the lobe as it leaves the solenoid. A slowing of the rotor, brought about by the application of a load for example, pulls the lobe back a distance where the retardation experienced on entering the stator solenoid is less than the impulse received on leaving the solenoid and thus a driving action is effected. Using the three phase stator herein described it is of course impossible that all three rotor disc lobes 165 simultaneously fulfill the above requirement of crossing a stator solenoid as the field thereof reverses, since the fields of the three solenoids are 120° out of phase. It will be found, however, that each lobe 165 fulfills the required condition in turn while the remaining two lobes effectively cancel each other. Thus for one revolution of the stator field each of the rotor disc lobes receives a driving impulse and synchronous turning of the armature is produced.

It will be understood that other methods of energizing the stator solenoids are possible. All three stator solenoids may be connected in parallel to a single phase current source and resonant synchronous operation will result, although a starting means other than the induction system described above must be provided.

While the invention has been disclosed with respect to a limited number of preferred embodiments, it will be apparent to those skilled in the art that numerous variations and modifications may be made within the spirit and scope of the invention and thus it is not intended to limit the invention except as defined in the following claims.

What is claimed is:

1. A dynamoelectric device comprising, in combination, at least one tubular solenoid coil, said coil being segmented whereby at least one transverse gap is formed therein, a rotor structure positioned in proximity to said coil the rotary axis of said rotor structure being aligned parallel to said coil, said rotor structure having at least one conducting radial projection positioned in the plane of said transverse gap of said coil, said conducting projection of said rotor structure extending outward from the rotary axis of said rotor structure a distance substantially exceeding the minimum displacement of said solenoid coil from said rotary axis whereby said projection traverses said gap as said rotor structure turns and interacts with the magnetic field thereof.

2. An electrical motor and generator comprising, in combination, a rotary armature, a plurality of electrical conductors disposed on said armature in perpendicular relationship to the rotary axis thereof, said conductors being spaced along the axis of said armature, and at least one solenoid coil disposed in proximity to said armature in parallel relationship to the rotary axis thereof, said solenoid coil being multiply segmented whereby said coil is provided with a transverse gap in the plane of each of said armature conductors, whereby said armature conductors traverse said gaps as said armature revolves and interact with the magnetic field of said coil.

3. An electrical motor and generator comprising, in combination, a rotary armature shaft, a plurality of substantially circular flat conductors secured to said shaft in perpendicular relationship thereto, said conductors being spaced along the length of said shaft, and a plurality of solenoid coils aligned in parallel relationship with said shaft and spaced around the azimuth thereof, each said coil having a transverse gap in the plane of each said armature conductor whereby said conductors sweep through the magnetic fields of said coils as said armature rotates and interact with said magnetic fields effecting an energy transduction.

4. In a dynamo electric apparatus, the combination comprising a rotor shaft, a plurality of flat substantially circular discs mounted coaxially on said rotor shaft and spaced along the length thereof, a plurality of electrical conductors secured to each said disc, a stator frame enclosing said rotor shaft, and a plurality of tubular solenoid coils mounted in said stator frame, said solenoid coils being aligned parallel with the axis of said rotor shaft and being distributed around the azimuth thereof, each said solenoid being formed of a plurality of thin spaced apart coil segments thereby being characterized by a plurality of transverse gaps, one such gap being in the plane of each of said discs, said solenoid coils being displaced from the axis of said rotor shaft a distance less than the maximum radius of said discs whereby said discs sweep through the interior of said solenoid coils and said conductors interact with the magnetic fields thereof.

5. Apparatus for the interconversion of electrical and mechanical energy comprising, in combination, a stator assembly formed of a plurality of coaxial juxtaposed annular frame elements, alternate ones of said elements having a substantially greater internal diameter than the others of said elements, a plurality of tubular solenoid coils secured within said stator assembly in parallel alignment with the axis thereof, said solenoid coils being equiangularly distributed around the axis of said stator assembly and being equidistant from said axis, each said solenoid coil being formed of a plurality of separated series connected coil segments, one of said coil segments of each said solenoid coil being mounted within each of said annular elements of lesser diameter, a revolvable rotor shaft mounted coaxially within said stator assembly, a plurality of discs secured coaxially to said rotor shaft and spaced along the length thereof, one of said discs being concentric with each of said annular elements of greater internal diameter, said discs having a radius exceeding the displacement of said coils from the axis of said stator whereby said discs extend transversely through said coils in the gaps between sections thereof, and a plurality of conductors forming at least a portion of said discs whereby interaction with the magnetic field of said solenoid coils is effected.

6. A dynamoelectric machine comprising, in combination, a stator formed of stacked coaxial annular frame members of non-magnetic material, alternate ones of said frame members having a substantially greater internal diameter than the others of said frame members, those of said frame members having the lesser internal diameter each being characterized by a like plurality of transverse circular openings which openings are equidistant from the center of said frame member and which are equiangularly spaced around the azimuth thereof, a plurality of solenoid coils disposed within said stator, each said solenoid coil being formed of a plurality of series connected separated coil sections, one of said sections being disposed in each of said openings in said frame member, a rotor shaft disposed axially within said stator for rotation therein, and a plurality of discs mounted coaxially on said rotor shaft and spaced along the length thereof, said discs having a thickness substantially equal to that of same frame members, one of said discs being concentric with each of said frame members of greater internal diameter, whereby said discs sweep through the gaps between adjacent ones of said coil sections and couple with the magnetic field of said solenoid coils.

7. A stator for use with dynamoelectric machines of the class utilizing a rotary armature comprising, in combination, a plurality of solenoid coils aligned parallel with the axis of said rotary armature and distributed around the azimuth thereof, each said solenoid coil being segmented into at least two coil sections which coil sections are separated a small distance forming a transverse gap in said coil, said transverse gaps of all of said solenoid coils being in a common plane whereby a conductor projecting radially from said rotary armature may be caused to sweep through the magnetic fields of each of said solenoid coils thereby interacting with the magnetic fields thereof.

8. In a stator for use in rotary electrical motors and generators, the combination comprising a frame structure having provision for mounting a rotary armature and a plurality of solenoid coils secured to said frame structure in parallel alignment with the rotary axis of said armature, said coils being distributed around the azimuth of said axis and being equidistant therefrom, each said solenoid coil being formed of a plurality of series connected coaxial coil segments which coil segments are spaced apart a small distance forming transverse gaps in said coils whereby conductors projecting radially from said armature may pass through said coils and interact with the magnetic field therein.

9. A stator for use with rotary dynamoelectric machines comprising, in combination, a plurality of annular frame members secured together in stacked coaxial relationship, alternate ones of said frame members having a substantially greater internal diameter than the others of said frame members, each of the frame members of lesser diameter having a like plurality of circular transverse openings which openings are equidistant from the center of the frame member and which are distributed equiangularly therearound, a plurality of segmented solenoid coils disposed within the structure formed by said frame members in parallel alignment with the axis thereof, each said solenoid coil being formed of a plurality of series connected coil sections, each said coil section having an axial thickness substantially equal to the axial thickness of said frame members and each said coil section being secured coaxially within one of said openings in said frame members of lesser internal diameter whereby said solenoid coils as a whole are characterized by a plurality of transverse gaps through which rotor conductors may sweep interacting with the magnetic field of said solenoid coils, and means secured to the structure formed by said frame members for journalling a rotor therein.

10. A dynamoelectric machine of the induction class comprising, in combination, a rotor shaft, at least one disc disposed coaxially on said rotor shaft, said disc having a plurality of radially directed conductors all of which conductors are electrically connected together at each extremity, and a plurality of solenoidal stator coils spaced around the azimuth of said rotor and aligned parallel therewith, each said solenoidal stator coil being segmented into spaced apart coil sections forming a transverse gap in the plane of said disc for receiving said disc whereby said radial conductors interact with the magnetic field of said solenoidal stator coils.

11. A dynamoelectric machine of the induction class comprising, in combination, a frame having spaced apart coaxial journals, a rotor shaft mounted in said journals, a plurality of spaced apart discs secured to said rotor shaft in coaxial relationship therewith, each said disc having a plurality of radially directed conductors which conductors are electrically interconnected at each extremity, a plurality of solenoidal stator coils secured to said frame in parallel alignment with said rotor shaft, each said solenoidal stator coil being segmented in the plane of each of said discs forming separate coil sections said coil sections being spaced apart a distance at least equal to the width of said discs, one of said coil sections of each of said solenoidal stator coils being on either side of each said disc whereby said radially directed conductors on said discs sweep through the interior of said solenoidal coils interacting with the magnetic field therein, and terminal means connecting said solenoidal stator coils with an alternating current system thereby establishing a revolving magnetic field around the azimuth of said disc.

12. In a dynamoelectric apparatus of the induction type, the combination comprising a stator formed of stacked annular frame members secured together in coaxial relationship, alternate ones of said frame members having a substantially lesser internal diameter than the others of said frame members, those of said frame members having the lesser internal diameter each being characterized by a like plurality of transverse circular openings which openings are equidistant from the center of said frame member and which are equiangularly spaced around the azimuth thereof, a plurality of solenoid coils disposed within said stator in parallel alignment with the axis thereof, each said solenoid coil being formed of a plurality of series connected separated coil sections, one of said sections being disposed in each of said openings in said frame members, a rotor shaft disposed axially within said stator for rotation therein, and a plurality of conducting discs secured coaxially to said rotor shaft and spaced along the length thereof, each said disc having a cartwheel design characterized by radial spokes connected together at the center by a hub and connected together at the outer end by an annular rim, one of said discs being concentric with each of said frame members of greater internal diameter whereby said radial spokes of said discs cut across the interior of said solenoid coils and interact with the magnetic field therein.

13. A dynamoelectric machine variously usable as a wound rotor induction motor or generator and as a D.C. field synchronous motor or generator, comprising, in combination, a rotor shaft having a plurality of longitudinal bus bars, a plurality of thin circular solenoidal windings distributed around the azimuth of said rotor shaft and secured thereto, said solenoidal windings all lying in a plane which is normal to said rotor shaft, said solenoidal windings each having terminals connecting with selected ones of said bus bars on said rotor shaft, a plurality of stator solenoid coils distributed around the azimuth of said rotor, and aligned parallel therewith, said stator solenoid coils having a diameter equal to that of said solenoidal rotor windings and being displaced from the axis of said rotor a distance equal to the displacement of said solenoidal windings therefrom, said stator solenoid coils each being segmented into at least two series connected coil sections, said coil sections being spaced apart and disposed one on either side of the plane of said solenoidal rotor windings whereby said rotor windings sweep transversely through said stator solenoid coils, a plurality of slip rings secured coaxially on said rotor shaft one connecting with each of said bus bars thereon, and a plurality of brushes one making electrical contact with each of said slip rings whereby external circuitry may be coupled to said solenoidal rotor windings.

14. A dynamoelectric machine for use as a wound rotor induction motor or generator substantially as described in claim 13 wherein said external circuitry coupled to said solenoidal rotor windings through said brushes said slip rings and said bus bars comprises a variable resistance connected between each pair of said brushes.

15. A dynamoelectric machine for use as a wound rotor D.C. field synchronous motor or generator substantially as described in claim 13 wherein said external circuitry coupled to said solenoid rotor windings through said brushes said slip rings and said bus bars comprises a direct current source for energizing said windings.

16. In a dynamoelectric apparatus usable as a wound rotor induction machine and usable as a D.C. field synchronous machine, the combination comprising a stator formed of stacked coaxial annular frame members, alternate ones of said frame members having a lesser internal diameter than the others of said frame members, a plurality of tubular stator solenoid coils disposed within said stator in parallel alignment with the axis thereof, said stator solenoid coils being distributed around the azimuth of said stator axis, each said stator solenoid coil being formed of a plurality of spaced apart series connected coil sections, said coil sections being secured within said frame members of lesser internal diameter, a rotor shaft axially mounted within said stator and provided with a plurality of longitudinal bus bars, a plurality of discs secured coaxially on said rotor shaft and spaced along the length thereof, one of said discs being concentric with each of said frame members of greater internal diameter, a plurality of solenoidal windings secured within each said disc in the plane thereof, said solenoid windings being substantially similar to said stator solenoid coil sections and being equally displaced from the axis of said rotor, said solenoid windings each connecting with selected ones of said bus bars, a plurality of slip rings disposed on said rotor shaft one connecting with each of said bus bars, and a plurality of brushes one making contact with each of said slip rings whereby external circuitry may be connected with said solenoidal windings of said rotor discs.

17. A dynamoelectric machine particularly for use with direct current systems comprising, in combination, a rotor shaft, a plurality of longitudinal bus bars thereon, at least one electrically nonconductive disc disposed coaxially on said rotor shaft, a winding disposed within said disc which winding comprises a plurality of flat coils positioned in the plane of said disc and distributed around the azimuth of said disc, said coils being mounted within said disc in overlapping relationship and being interconnected in series, each said coil havng a tap connecting with an individual one of said bus bars, at least one stator solenoid coil aligned parallel to the axis of said rotor shaft and spaced therefrom a distance equal to the spacing of said rotor winding coils therefrom, said stator solenoid coil having a cross sectional area substantially equal to the cross sectional area of said rotor winding coils, said stator solenoid coil being separated into at least two series connected sections one of which is disposed on either side of said disc, and commutator means bearing against said rotor shaft for connecting said rotor winding with a direct current system.

18. Apparatus variously usable as a direct current motor and generator comprising, in combination, a frame having spaced apart coaxial bearings, a rotor shaft mounted in said bearings, a plurality of longitudinal bus bars secured to said rotor shaft, a plurality of discs secured coaxially to said rotor shaft and spaced along the length thereof, a rotor winding mounted within each said disc, said rotor winding comprising a plurality of coils distributed around each said disc in a concentric annular band, said coils being coplanar with said disc and being overlapping, said coils further being series connected and each said coil having a tap connecting with an individual one of said bus bars on said rotor, commutator means acting on said rotor shaft for connecting said rotor windings with a direct current circuit, and a plurality of stator solenoid coils secured to said frame in parallel relationship to said rotor shaft, said solenoid coils being distributed around the azimuth of said rotor shaft and having a cross sectional area substantially equal to the cross sectional area of said rotor winding coils, each said stator solenoid coil being multiply segmented into spaced apart series connected sections which sections are alternated with said rotor discs whereby said discs and more particularly said windings thereon sweep through the interior of said stator solenoid coils and interact with the magnetic field thereof.

19. A dynamoelectric machine of the direct current class comprising a plurality of annular non-magnetic frame members secured together in stacked coaxial relationship forming a stator frame, alternate ones of said frame members having a lesser internal diameter than the others of said frame members, each said frame member of lesser internal diameter having a plurality of like circular openings which openings are equidistant from the center of said frame member and which are equiangularly spaced around the azimuth thereof, a plurality of segmented solenoid coils disposed within the structure formed by said frame member, in parallel relationship to the axis thereof, each said solenoid coil being formed for a plurality of series connected coil sections, each said coil section being coaxially secured within one of said openings in said frame members of lesser internal diameter whereby said solenoid coils as a whole are characterized by a plurality of transverse gaps, a pair of bearings secured to said stator frame at the axis thereof, a rotor shaft mounted in said bearings, a plurality of longitudinal bus bars secured to said rotor shaft, a plurality of discs secured coaxially to said rotor shaft and spaced along the length thereof, one said disc being concentric with each said frame member of greater internal diameter, a rotor winding mounted in each said disc which winding comprises a plurality of coils distributed in an annular band around each said disc, said coils being coplanar with said disc and having an area substantially equal to the cross sectional area of said stator solenoid coils, said coils being mounted in said disc in an overlapping relationship, said rotor coils being series connected and each said coil having a tap connecting with one of said bus bars on said rotor shaft, and commutator means secured to said stator frame and making electrical connection with said bus bars.

20. In a resonant synchronous dynamoelectric apparatus, the combination comprising at least one solenoid coil constituting a stator, said solenoid coil being transversely segmented into at least two series connected sections which sections are spaced apart a small distance forming a transverse gap in said coil, a rotor shaft aligned parallel to the axis of said solenoid coil and displaced laterally therefrom, a flat conductor disposed on said rotor shaft in perpendicular relationship thereto, said conductor being situated in the plane of said transverse gap of said solenoid coil, said conductor having a radial dimension which varies with azimuth, at least one first sector of said conductor having a radial length exceeding the displacement of said solenoid coil from said rotor shaft and at least one second sector of said conductor having a radial length substantially less than that of said first sector whereby said first sector of said conductor periodically traverses said solenoid coil as said rotor shaft revolves, and terminal means for connecting said solenoid coil with an alternating current system whereby a repelling interaction between the magnetic field within said solenoid and said conductor is effected.

21. In a resonant synchronous dynamoelectric machine, the combination comprising a rotor shaft, a plurality of like flat conductors secured thereon in perpendicular relationship thereto, said flat conductors being spaced apart along said rotor shaft and having a radial dimension which varies with azimuth, alternate sectors of said conductors extending further from said rotor shaft than the intervening sectors of said conductors, a plurality of solenoid coils distributed around the azimuth of said rotor shaft in parallel alignment therewith, said solenoid coils being displaced from said rotor shaft a distance less than the maximum radial length of said conductors and exceeding the minimum radial length of said conductors, each said solenoid coil being segmented into a plurality of spaced apart series connected coil sections which coil sections alternate with said conductors whereby said conductors sweep across the interior of said coils as said rotor shaft revolves, and terminal means for connecting said solenoid coils with an alternating current system.

22. In a resonant synchronous dynamoelectric machine substantially as described in claim 21 and particularly for use as a motor, the further combination of starting means comprising at least one circular disc disposed coaxially on said rotor shaft and replacing one of said flat conductors thereon, said disc being characterized by a plurality of radially directed conductors electrically connected together at the hub of said disc and at the periphery thereof whereby said motor may be started by induction action, and switch means for disconnecting those portions of said solenoid coils adjacent said disc from said terminals when said motor has been started, said switch means being further adapted to connect those portions of said solenoid coils adjacent said flat conductors to said terminals simultaneously with the first described switching operation whereby said motor operates by resonant synchronous action.

23. A resonant synchronous dynamoelectric machine comprising a plurality of annular frame members stacked together in coaxial relationship forming a stator frame, alternate ones of said frame members having a lesser internal diameter than the intervening ones of said frame members, a plurality of solenoid coils secured within said stator frame in parallel alignment with the axis thereof, said solenoid coils being distributed around the azimuth of said axis and being multiply segmented into a plurality of spaced apart series connected coil segments, one of said coil segments of each said coil being mounted within each said frame member of lesser internal diameter, means connecting said solenoid coils with an alternating current system thereby establishing a rotating magnetic field, a rotor shaft disposed axially within said stator frame, a plurality of flat conductors secured to said rotor shaft in normal relationship thereto, said conductors being spaced apart along said rotor shaft and each being concentric with one of said intervening ones of said frame members, said conductors having a radial dimension which varies systematically with azimuth, said variation in radial dimension forming a lobed structure including a number of radially short sectors alternated with a like number of radially long sectors, which number is equal to the number of said solenoid coils, said radially long sectors having a length exceeding the maximum displacement of said solenoid coils from said rotor shaft whereby said radially long sectors of said conductors traverse the interior of said solenoid coils, and means initiating a rotary motion of said rotor shaft and said conductors thereon in a sense opposite to that of said revolving magnetic field.

References Cited in the file of this patent

UNITED STATES PATENTS

| | | |
|---|---|---|
| 286,247 | Wolcott | Oct. 9, 1883 |
| 1,275,665 | Eichbaum | Aug. 13, 1918 |
| 1,605,796 | Tanzler | Nov. 2, 1926 |
| 2,743,375 | Parker | Apr. 24, 1956 |

FOREIGN PATENTS

| | | |
|---|---|---|
| 509,726 | Great Britain | July 20, 1939 |